Figure 1:
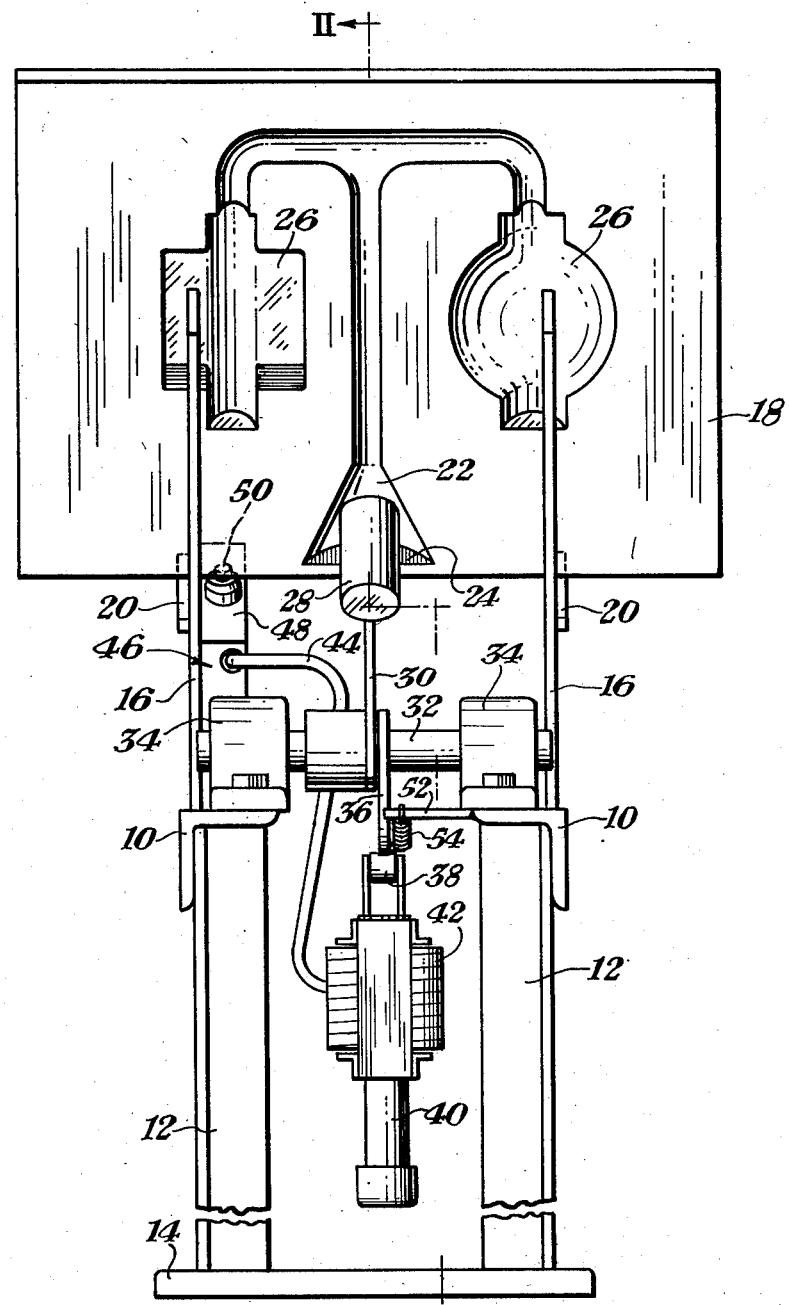

Sept 17, 1957 G. J. JACKSON 2,806,265
MECHANISM FOR REMOVING EXCESS MATERIAL FROM SHELL MOLDS
Filed Sept. 28, 1954 2 Sheets-Sheet 1

INVENTOR.
George J. Jackson.
BY
HIS ATTORNEY

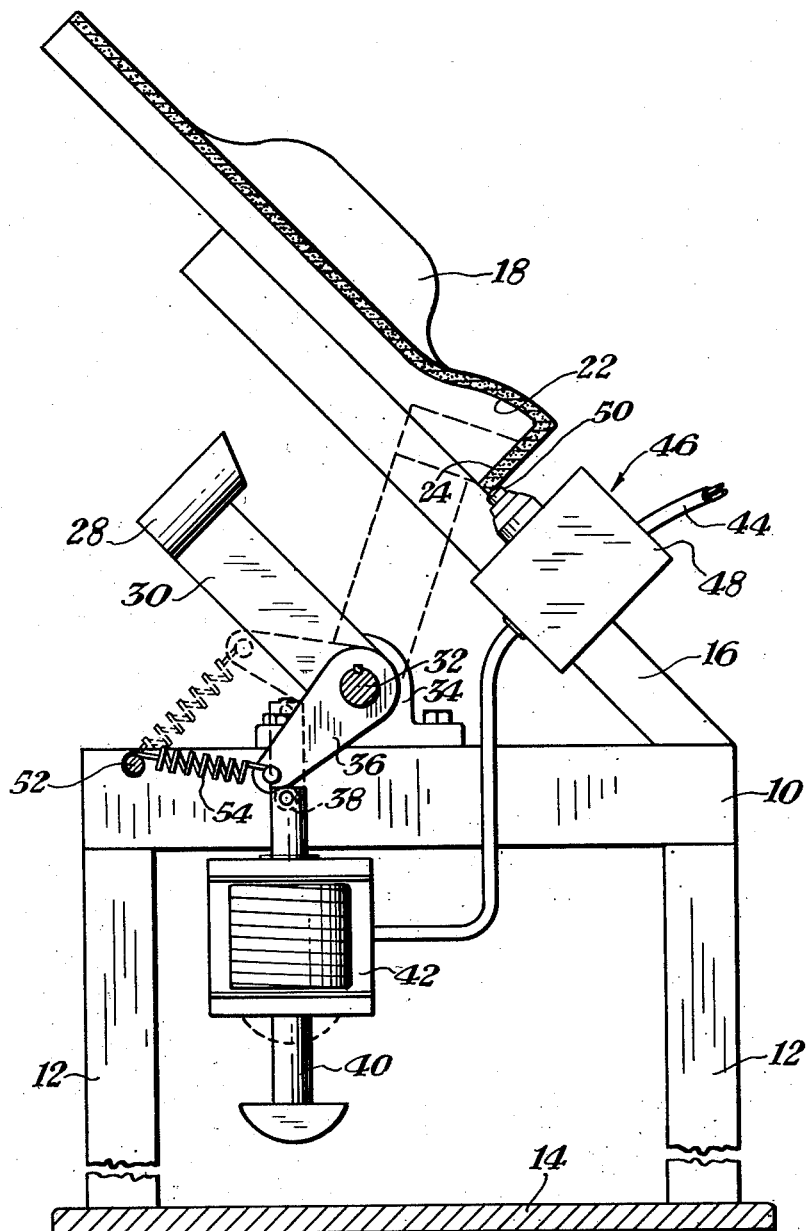

United States Patent Office 2,806,265
Patented Sept. 17, 1957

2,806,265

MECHANISM FOR REMOVING EXCESS MATERIAL FROM SHELL MOLDS

George J. Jackson, Scituate, Mass., assignor to Walworth Company, Boston, Mass., a corporation of Massachusetts Application September 28, 1954, Serial No. 458,855

2 Claims. (Cl. 22—95.7)

This invention relates to apparatus for preparing shell molds and more particularly to apparatus for removing excess mold material from a shell mold after the same has been formed.

Shell molds are produced by depositing a mixture of sand and synthetic resin binder in a layer upon a heated pattern plate to fuse the resin and bind the sand particles together with subsequent heating serving to cure the resin and form a relatively hard, brittle shell.

Each pattern necessarily includes pattern means for forming a pouring basin or sprue for the reception of molten metal during a casting operation. Such pattern means usually take the form of a half cone formed on the molding surface of the pattern plate. The half cone is completely covered with molding material when the molding mixture is deposited on the pattern plate. As a result, the molding material adjacent the base of the cone forms what is known as a "sprue cap" effectively closing the sprue of the cured mold. The excess mold material forming this cap must be removed before the mold can be used in a casting operation wherein molten metal is poured into the sprue.

It is a principal object of this invention to remove excess mold material from a shell mold.

Another object of this invention is to remove the "sprue cap" from a shell mold.

Another object is to simplify removal of excess mold material from a shell mold.

Another object of this invention is to remove excess mold material from a shell mold through the use of automatic machinery. To this end, in a preferred embodiment of the invention, means is provided for supporting a mold and hammer means is provided for striking the sprue cap sharply to break it away from the remainder of the mold.

Other objects and advantages will appear from the following specification taken in connection with the accompanying drawings wherein:

Fig. 1 is an elevation of an apparatus for removing excess mold material from a shell mold and embodying this invention; and Fig. 2 is a sectional view taken on the line II—II of Fig. 1.

Referring more particularly to the drawings, the apparatus for removing excess mold material is here shown as comprising a bed formed of a pair of spaced angles 10 each of which is supported on a pair of legs 12 secured to a suitable base plate 14.

Secured to each of the angles 10 by welding or the like is a cantilever beam 16. Each beam 16 extends from its associated angle 10 at an angle of approximately 45° to the horizontal to enable a shell mold 18 to be placed thereon conveniently. Secured to and projecting above the upper edge of each beam 16 is a lug 20 which is adapted to engage the edge of the shell mold 18 and prevent the same from sliding down the beams 16. The beams 16 and lugs 20 thus provide means for supporting the shell mold 18.

The shell mold 18 herein disclosed is typical of such molds and includes a sprue 22 in the form of a half cone which is closed at one end by a sprue cap 24. The sprue communicates through suitable runners with mold prints 26. When a shell mold of the type shown is to be used in a casting operation, it is secured to a matching mold half and molten metal is poured into the sprue 22. However, to permit the metal to be so poured, the sprue cap 24 must be removed. In the present invention, removal of the sprue cap 24 is effected through the provision of hammer means adapted to strike the sprue cap 24 sharply and break the same away from the remainder of the mold 18 when the mold 18 is supported on the beams 16.

The hammer means comprises a relatively heavy hammer head 28 secured to the end of a lever arm 30 which is mounted for rotation with a shaft 32. The shaft 32 extends transversely between the angles 10 and is journaled in a pair of bearings 34 respectively mounted on the angles 10. An actuating lever 36 is keyed at one end to the shaft 32 and is engageable at its other end with a roller 38 movable with a plunger 40 of a solenoid motor 42 depending from a strap 42 secured at opposite ends to the legs 12. The winding of the solenoid 42 is adapted to be connected to a source of electric power (not shown) by an electric cable 44 through a switch mechanism 46.

The switch mechanism 46 includes a casing 48 secured to one of the beams 16 adjacent one of the lugs 20 and an actuating button 50 extends out of the casing 48 beyond the upper edge of the lug 20. The button 50 is thus positioned to be engaged by the edge of the mold 18 when the mold is placed upon the beams 16 in engagement with the lugs 20. The switch mechanism 46 is adapted to maintain the energizing circuit for the solenoid motor 42 normally opened with depression of the button 50 being effective to close the circuit and energize the solenoid 42. Thus the button 50 is depressed to energize the solenoid 42 in response to positioning of the mold 18 upon the beams 16.

The plunger 40 of the solenoid 42 is reciprocable along a vertical axis and is normally retained in its lowermost position as shown in the drawings by gravity. However, upon energization of the solenoid 42, the plunger 40 is moved upward as viewed in the drawings to swing the actuating lever 36 in a clockwise direction as viewed in Fig. 2 thereby imparting rotational movement to the shaft 32 and swinging the hammer head 28 sharply into engagement with the sprue cap 24, the hammer head 28 being positioned as shown in broken lines in Fig. 2 when it engages the sprue cap 24.

After the hammer head 28 strikes the sprue cap 24, it will continue to move through and out of the sprue 22 under the influence of its own inertia and the actuating lever 36 will be moved therewith out of engagement with the roller 38 on the plunger 40.

Secured to the free end of the actuating lever 36 and to a suitable projection 52 extending from one of the angles 10, is a coil spring 54 which serves to return the assembly of the hammer head 28 and actuating lever 36 to its initial position after the hammer head has moved out of the sprue 22. Preferably, the spring 54 is relatively slack in the initial position of the hammer 28 as shown in full lines in the drawings. However, the length of the spring 54 is selected to cause the spring to be elongated by movement of the actuating lever 36 with the hammer head 28 when the latter passes through and out of the sprue 22. Thus, the bias of the spring 54 is not effective until after the sprue cap 24 has been struck by the hammer head 28 and the spring 54 in no way detracts from the sharpness of the blow delivered by the hammer head 28.

In operation, an operator simply places a shell mold 18 upon the beams 16 and slides the mold downward into engagement with the lugs 20. As the mold 18 moves into engagement with the lugs 20, the edge thereof contacts the button 50 to cause the switch mechanism 46 to close the energizing circuit for the solenoid 42. The solenoid 42 then actuates the plunger 40 to swing the hammer head 28 sharply into engagement with the sprue cap 24 and break the same away cleanly from the mold 18. It will therefore be apparent that operation of the disclosed apparatus is extremely simple as the operator need do no more than place the shell mold on the supporting beams 16 to effect removal of the excess mold material.

While only a single embodiment of the invention has been illustrated and described, the invention obviously may take other forms and be variously applied within the scope of the appended claims.

It is claimed and desired to secure by Letters Patent:

1. Mechanism for removing excess material from a shell mold comprising a support having a pair of spaced elements projecting upwardly at an angle therefrom, said spaced elements being adapted to receive and retain a shell mold against downward sliding movement thereon, a hammer pivoted on said support for rotation in an arcuate path between said spaced elements and adapted during said rotation to engage a portion of the mold retained thereby, an actuating lever movable with said hammer, electromagnetic means carried on said support and having an operating plunger engageable with said lever, switch means carried on one of said elements for controlling said electromagnetic means and adapted for operative engagement by the mold retained thereby for causing rotation of said hammer in a direction for operative engagement with the mold to remove excess material therefrom, and yieldable means operable between said lever and said support for rotating said hammer in an opposite direction upon completion of said material removal.

2. Mechanism for removing excess material from a shell mold comprising a support having a pair of spaced elements projecting upwardly at an angle therefrom, said spaced elements being adapted to receive and retain a shell mold against downward sliding movement thereon, a hammer pivoted on said support for rotation in an arcuate path between said spaced elements and adapted during said rotation to engage a portion of the mold retained thereby, an actuating lever projecting downwardly at an angle with said hammer and movable therewith, electromagnetic means including a solenoid motor depending from said support and an operating plunger reciprocable by said motor in the plane of said lever and engageable therewith, switch means carried by one of said elements for controlling said motor and being normally open, said switch means being adapted for operative engagement by the mold retained by said spaced elements for movement to closed position for energizing said motor and causing rotation of said hammer in a direction for operative engagement with the mold to remove excess material therefrom, and yieldable means operable between said lever and said support for rotating said hammer in an opposite direction upon completion of said material removal.

References Cited in the file of this patent
UNITED STATES PATENTS

| | | |
|---|---|---|
| 458,381 | Watson | Aug. 25, 1891 |
| 1,444,905 | Dittman | Feb. 13, 1923 |
| 2,363,630 | Wales | Nov. 28, 1944 |
| 2,589,347 | Demerath | Mar. 18, 1952 |